Patented Feb. 3, 1931

1,791,444

UNITED STATES PATENT OFFICE

GUILLAUME DE MONTMOLLIN, OF BASEL, SWITZERLAND, ASSIGNOR TO SOCIETY OF CHEMICAL INDUSTRY IN BASLE, OF BASEL, SWITZERLAND

AZO DYESTUFFS

No Drawing. Application filed July 21, 1928, Serial No. 294,581, and in Switzerland July 30, 1927.

The present invention relates to the manufacture of new azo-dyestuffs, and it comprises the new products, the process of making same, and the material that has been dyed with the new products.

It has been found that very valuable azo-dyestuffs are obtained by coupling an arylide of the 2:3-hydroxy-naphthoic acid of the general formula:

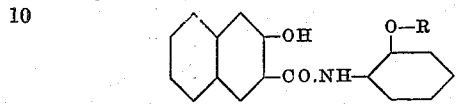

in which R signifies aryl or aralkyl, with diazo-compounds of the general formula

in which R signifies also aryl or aralkyl. The dyestuffs thus obtained form red powders which correspond with the formula

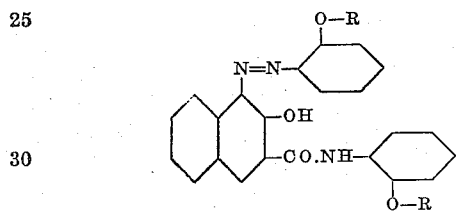

in which R stands for aryl or aralkyl, and are characterized by their brightness and their fastness properties. They are best produced on a suitable substratum.

The following examples illustrate the invention:—

Example 1

219.5 parts by weight of 4-chloro-2-aminodiphenyl ether are diazotized as usual. The diazo-solution, neutralized with sodium acetate, is allowed to flow into an alkaline solution of 355 parts of the arylide from 2:3-hydroxynaphthoic acid and ortho-aminodiphenyl ether. Stirring is continued until the formation of dyestuff is complete and the whole is then filtered. The dyestuff thus obtained may be used for making red varnishes. It forms a red powder and corresponds with the formula

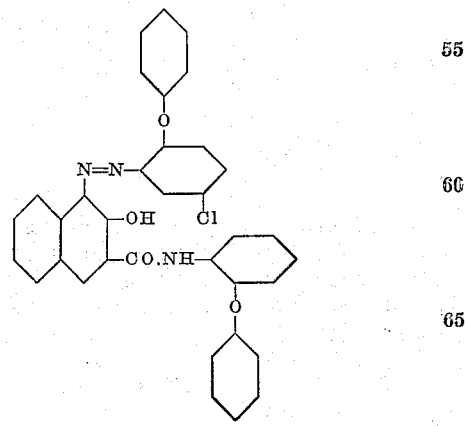

For the 4-chloro-2-aminodiphenyl ether there may be substituted the corresponding cresyl-, chlorophenyl- or chlorocresyl-ether. There may also be used sulfonated diazo-compounds, such for instance as 2-diazo-1-phenylether-4-sulfonic acid.

Example 2

Cotton yarn is impregnated with a grounding bath which is made by dissolving 10 grams of the arylide from 2:3-hydroxynaphthoic acid and ortho-aminodiphenyl ether in 300 cc. of hot water with addition of 25 cc. of caustic soda solution of 30 per cent. strength and 15 cc. of Turkey red oil and final dilution to 1 litre. The yarn is then evenly wrung out and developed in a solution containing 4.4 grams of diazotized 4-chloro-2-aminodiphenyl ether per litre, and neutralized with sodium acetate. After washing and soaping there is obtained a pure bluish-red dyeing of excellent fastness to washing, keir-boiling and chlorine.

In this case also other diazo-compounds may be used, such as diazotized ortho-aminodiphenyl ether or the corresponding cresyl- chlorophenyl- or chlorocresyl ether. Also the diazotized benzyl-ethers of ortho-aminophenols or ortho-aminocresols, yield valuable tints.

What I claim is:—

1. As new products the azo-dyestuffs of the general formula

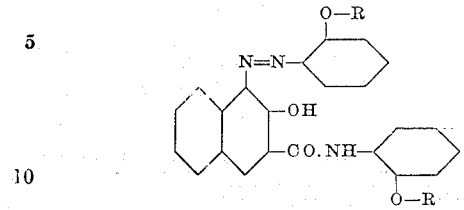

wherein R signifies aryl or aralkyl, which products form red powders valuable as pigments and dyeing the fibre very fast red when produced on this material.

2. As new products the azo-dyestuffs of the general formula

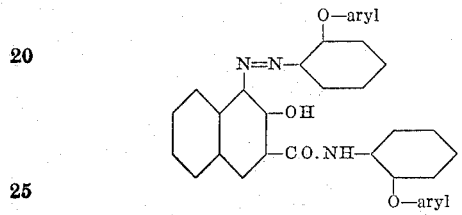

which products form red powders valuable as pigments and dyeing the fibre very fast red when produced on this material.

3. As a new product the azo-dyestuff of the formula

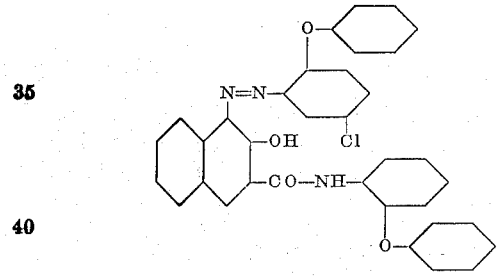

which product forms a red powder valuable as a pigment and dyeing the fibre very fast red when produced on this material.

4. The material dyed with the products of claim 1.

5. The material dyed with the products of claim 2.

6. The material dyed with the product of claim 3.

In witness whereof I have hereunto signed my name this 12th day of July, 1928.

GUILLAUME DE MONTMOLLIN.